United States Patent Office 3,287,312
Patented Nov. 22, 1966

3,287,312
PREPARATION OF FLAME-RESISTANT CROSS-LINKED POLYETHYLENE COMPOSITIONS
Ting Hung Ling, Marion, Ind., assignor, by mesne assignments, to Anaconda Wire and Cable Company, a corporation of Delaware
No Drawing. Filed July 10, 1962, Ser. No. 208,910
16 Claims. (Cl. 260—41)

This invention relates to a process for cross-linking polyethylene in which the polymer chains are induced to undergo bond formation with themselves and with various other compounds dispersed throughout the polymer. The invention provides an improved process for preparing a flame-resistant cross-linked polyethylene composition and is based on the discovery that it is possible to structurally modify a polyethylene system containing an inorganic fluoroborate by cross-linking the polymer chains with themselves and probably with the inorganic fluoroborate to produce a thermosetting composition which possesses an exceptionally high degree of flame retardance and which is thermally stable at relatively high temperatures. Moreover, by incorporating antimony trioxide in the polyethylene system, it is also possible to improve the physical properties of the resultant structural composition over that obtained in the absence of antimony trioxide. The flame-resistant cross-linked polyethylene compositions produced by the method of the invention are also within the scope of the invention.

Polyethylene is a rigid, waxy, translucent, synthetic resin having excellent dielectric properties, ozone resistance, moisture resistance, and chemical stability, although it is highly inflammable, possessing a low degree of flame retardance. It has been extensively used in recent years for insulating high-frequency conductors which normally carry only small currents. Although polyethylene possesses excellent chemical and electrical properties as an insulating material for high-voltage power cables which carry relatively large currents, its use for this purpose has been limited due to its extremely high coefficient of thermal expansion and to its tendency to deform under stress at elevated temperatures, both of which devolve, in part, from the relatively low softening point of polyethylene which is about 105° C. while the volumetric expansion of polyethylene is approximately 4 percent when its temperature increases from 20° C. to 40° C. An operating temperature range of this magnitude is not at all unusual in high-voltage power cables.

The softening point of polyethylene undergoes a marked increase when linear polyethylene chains are cross-linked to form a three-dimensional matrix similar to that of non-linear polymers. Structural modification of polyethylene by cross-linking or "curing" (the two terms being synonymous and interchangeably used) decreases both the thermoplasticity and the solubility of the polymer but increases its resistance to deformation under stress at elevated temperatures. X-ray diffraction studies of cross-linked polyethylene indicate that the cross-linked polymer undergoes a decrease in the degree of crystallinity, primarily because the three-dimensional lattice of the cross-linked polymer is incapable of forming a lattice plane. Although the chemical properties of cross-linked polyethylene do not appear to vary significantly from those of uncured polyethylene, there is some evidence that the resistance to corona discharge of the cross-linked polymer is somewhat higher than that of the cured material.

Various processes have been developed to alter the molecular structure of polyethylene by cross-linking. In general, these processes are based on generating a free radical in the polymer system, either by pyrochemically dissociating a thermally unstable compound into one or more free radicals which initiate radical formation in the polymer chains, or by subjecting the polymer system to high-energy radiation to cause homolytic scission of several of the carbon-hydrogen bonds in the polymer, cross-linking taking place in both instances through covalent bond formation between polymer radicals. By way of illustration, when a homopolymer of ethylene is irradiated with massive electron bombardment in the range from about 10 to about 40 megarads, homolytic scission occurs in several of the carbon-hydrogen and carbon-carbon bonds in the molecule and causes the formation of polymer radicals, which combine with each other to form covalent bonds and thereby cross-link the polymer chains. Similarly, when polyethylene is blended with a small amount of an organic peroxide, such as benzoyl peroxide or bis-($\alpha,\alpha$-dimethylbenzyl) peroxide, and then heated to the dissociation temperature of the peroxide, the peroxide undergoes homolytic scission into two radicals, which, in turn, may further rearrange into more active radicals. Collision of these radicals with the polyethylene chains results in the generation of polymer radicals, which, of course, combine to form covalent bonds and thereby cross-link the polymer chains.

Although cross-linked polyethylene possesses a much higher melting point and better thermal stability than uncured polyethylene, unfortunately its flame resistance is not correspondingly better than that of thermoplastic or linear polyethylene. The flammability of polyethylene, or of any plastic material, is a measure of the rate at which it burns when ignited and is generally measured by the A.S.T.M. flammability test D–635–44. In this test, a sample of plastic is ignited by flaming it for 30 seconds with a Bunsen burner flame, and the rate of burning (in inches per minute) then measured. A sample which fails to continue burning after two such ignitions is termed "self-extinguishing," possessing flame retardant propetries.

Using a blended mixture of polyethylene and an inorganic fluoroborate, I have found that it is possible to induce cross-linking of the polymer chains with themselves and probably with the inorganic fluoroborate by generating free radicals within the polymer mixture either by subjecting the mixture to massive electron bombardment, or by incorporating a small amount of an organic peroxy free radical generator in the mixture and then heating the mixture to a temperature above that which the organic peroxy free radical generator pyrochemically decomposes into a free radical. The cross-linked polyethylene composition produced by either method does not melt below 300° C., and is sself-extinguishing, possessing outstanding thermal stability at lower temperatures as well as an extraordinarily high degree of flame retardance. The flame-resistant cross-linked polyethylene compositions of the invention are characterized by excellent chemical and electrical properties and so are particularly useful in insulating high-voltage electric power cables, though their utility is not limited to this field.

The flame retardant properties of the cross-linked polyethylene composition of the invention are primarily due to the presence of the inorganic fluoroborate in the system. Although many inorganic fluoroborates may be used to impart flame resistance to the cross-linked polyethylene composition, outstanding results may be obtained by using such inorganic fluoroborates as ammonium fluoroborate, sodium fluoroborate, potassium fluoroborate, calcium fluoroborate, magnesium fluoroborate, barium fluoroborate, or strontium fluoroborate. To obtain an optimum level of flame retardance in the cross-linked polyethylene composition without sacrificing the degree of cross-linking, the inorganic fluoroborate should be blended with the polyethylene prior to cross-linking, using concentrations in the range from about 4 to about 20 percent by weight, based on the weight of polyethylene in the blended mixture.

Based on these discoveries, the invention provides an improved process for preparing a flame-resistant cross-linked polyethylene composition which comprises uniformly blending a normally solid polymer of ethylene with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and strontium fluoroborate, and then generating free radicals within the resultant mixture to induce cross-linking of the polymer chains.

The maximum degree of flame-resistance in the cross-linked polyethylene composition may be obtained by using from about 4 to about 20 percent by weight of one or more of the aforementioned inorganic fluoroborates, and from about 2 to about 30 percent by weight of antimony trioxide, all percentages being based on the weight of polyethylene in the blended mixture. The polyethylene composition may also contain, in addition, desired amounts up to a total of, say, 25 percent by weight of fillers, pigments, or vulcanizing accelerators.

Cross-linking of the blended mixture of polyethylene and the inorganic fluoroborate requires the generation of free radicals in the mixture, which may be accomplished either by subjecting the blended mixture to irradiation or by incorporating an organic peroxy free radical generator in the blended mixture and then heating the resultant mixture to a temperature above that at which the organic peroxy free radical generator pyrolytically decomposes into a free radical. When cross-linking is induced by irradiation, massive electron bombardment of the formulation, using dosages in the range of from about 10 to about 40 megarads, generally is sufficient to induce cross-linking of the polymer chains to form an excellent flame-resistant, thermally stable polyethylene composition.

Alternatively, the blended mixture may be cross-linked by incorporating a small amount of an organic peroxy free radical generator in the system, and then heating the resultant mixture to a temperature above that at which the particular organic peroxy free radical generator pyrochemically decomposes into a free radical, thereby generating free radicals in the mixture and inducing cross-linking of the polymer chains.

Any organic peroxy free radical generator, which substances are capable either of pyrochemically decomposing into a free radical or of disproportionating into a free radical in the presence of a proton acceptor, or any compounds capable of forming such a free radical generator in situ, may be selected for inclusion as a cross-linking agent in the blended mixture of polyethylene and the inorganic fluoroborate in accordance with the invention. Particularly satisfactory results may be obtained, however, by using an organic peroxide in which each of the peroxy oxygen atoms is linked to a tertiary carbon atom. Table I lists several organic peroxide free radical generators which have been found to be particularly satisfactory cross-linking agents in preparing the flame-resistant cross-linked polyethylene compositions in accordance with the invention.

TABLE I

*Organic peroxide free radical generators*

Bis-($\alpha,\alpha$-dimethylbenzyl) peroxide
Bis-(p-methyl-$\alpha,\alpha$-dimethylbenzyl) peroxide
Bis-(p-isopropyl-$\alpha,\alpha$-dimethylbenzyl) peroxide
t-Butyl $\alpha,\alpha$-dimethylbenzyl) peroxide
Di-t-butyl peroxide
2,5-di-(t-butylperoxy)-2,5-dimethylhexane
t-Butyl triphenylmethyl peroxide
Benzyl $\alpha$-methylbenzyl peroxide
Benzoyl peroxide
Lauroyl peroxide
Stearoyl peroxide Theoretically, the concentration of the free radical generator initially added to the polyethylene inorganic fluoroborate system is dependent upon the extent to which the polyethylene is to be cross-linked, which, in turn, is dependent upon the rate at which polymer radicals are generated in the system. The rate at which polymer radicals are formed is, of course, a function of several variables, including the kinetics of disproportionation of the free radical generator into a free radical, as well as the concentration of the free radical generator. Generally, the more complete the degree of cross-linking, the greater will be the amount of free radical generator required in the polyethylene mixture. In practice, a large excess of free radical generator preferably is used to cross-link the polyethylene system. This excess may be from twofold to as high as a hundredfold over the amount theoretically required to initiate the formation and subsequent generation of polymer radicals. Consequently, these free radical generators may be used over a very wide range of concentrations. In most cases, I prefer to use the free radical generator in an amount in the range from about 0.2 to 10 percent by weight based on the weight of the polyethylene in the blended mixture.

To prepare the cross-linked polyethylene composition of the invention by pyrochemically forming free radicals in the system, a normally solid polymer of ethylene, preferably having a molecular weight in excess of 10,000, is intimately blended together with the inorganic fluoroborate, and the organic peroxy free radical generator, using a roll mill or any other convenient mixing equipment. The precise order of mixing is immaterial, but care must be taken during the milling operation to avoid overheating and prematurely curing the blended mixture. Any filler, pigment accelerator, stabilizer, or other desired ingredient preferably is also incorporated at this stage.

After thoroughly and intimately mixing the components, the blended mixture may be shaped by any convenient means, such as molding, extruding, or rolling into sheets, and it is then heated to a temperature above that at which the organic peroxy free radical generator undergoes pyrochemical decomposition or disproportionation into a free radical, thereby generating free radicals within the mixture and inducing the polymer chains to cross-link with themselves and probably with the inorganic fluoroborate particles. The temperature at which curing occurs is dependent, of course, upon the particular free radical generator employed as the cross-linking agent. Most of the organic peroxy free radical generators which may be used in the process of the invention undergoe dissociation into free radicals over the broad range of temperatures from 80° C. to about 250° C. For example, when bis($\alpha,\alpha$-dimethylbenzyl) peroxide, di-t-butyl peroxide, or 2,5-di-(t-butylperoxy)2,5-di-methylhexane are employed as cross-linking agents, effective cures may be obtained at temperatures ranging from 140° C. to 160° C., or even slightly higher.

The following example is illustrative of the ease with which the flame-resistant cross-linked polyethylene compositions may be prepared in accordance with the invention:

A blended mixture containing 73.62 pounds of polyethylene (M.W. ca. 12,000), 19.8 pounds of antimony trioxide, 5.58 pounds of ammonium fluoroborate, 0.25 pound of a polymerized trimethyldihydroquinoline ["Agerite Resin D"], 0.75 pound of 4,4'-butylidene-bis-(6-t-butyl-m-cresol) was milled until it was homogeneous. The blended mixture was extruded about a copper conductor (No. 20 AWG), and then irradiated in a General Electric electron-beam generator, using a dosage of 30 megarads at room temperature. The resultant insulation did not melt at 300° C., and was self-extinguishing when subjected to the flammability test designated as A.S.T.M. D–635–44. The physical properties of this flame-resistant cross-linked polyethylene composition, both upon curing and after accelerated aging, are set forth below in Table II:

TABLE II
*Properties of flame-resistant cross-linked polyethylene composition*

A. INSULATION

| | |
|---|---|
| Tensile strength (p.s.i.) | 3248 |
| Elongation (percent) | 97 |

B. COMPLETED WIRE

| | |
|---|---|
| Insulation resistance (megohms/1000′) | 26,500 |
| Heat resistance: | |
| 225° C., 4 hrs. with wt. | No crack |
| Breakdown kv. | 9.0 |
| Heat resistance: | |
| 185° C., 96 hrs. no wt. | No crack |
| Breakdown kv. | 10.1 |
| Cold bend: | |
| −55° C., 4 hrs. with wt. | No crack |
| Breakdown kv. | 10.4 |
| Solderability | O.K. |
| Flammability | Passed |
| Corrosion | None |
| Dielectric constant at 1 megacycle | 2.62 |

C. OTHER TESTS

| | |
|---|---|
| Power factor at 1 megacycle | 0.1007 |
| Shrinkage (6 inch sample) at 185° C., 15 min. | None |

D. REMARKS

| | |
|---|---|
| Insulation-post-heat at 225° C., 30 sec.: | |
| Tensile strength (p.s.i.) | 2918 |
| Elongation (percent) | 295 |

In the foregoing example of the invention, the polymer chains were cross-linked by forming free radicals in the blended mixture through massive electron bombardment of the system. Similar advantages are also attained by forming free radicals in the blended mixture through the pyrochemical decomposition of an organic peroxy free radical generator. In general, the method of the invention is applicable to the preparation of a flame-resistant cross-linked polyethylene composition by generating free radicals in a polyethylene system containing an inorganic fluoroborate either alone or in combination with antimony trioxide.

I claim:

1. A process for preparing a flame-resistant cross-linked polyethylene composition which comprises uniformly blending a normally solid polymer of ethylene with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and strontium fluoroborate, and generating free radicals within the resulting mixture to induce cross-linking of the polymer chains.

2. A process for preparing a flame-resistant cross-linked polyethylene composition which comprises uniformly blending a normally solid polymer of ethylene with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and strontium fluoroborate, and from about 2 to about 30 percent by weight of antimony trioxide, all percentages being based on the weight of the polyethylene in the composition, and generating free radicals within the resultant mixture to induce cross-linking of the polymer chains.

3. A process for preparing a flame-resistant cross-linked polyethylene composition which comprises uniformly blending a normally solid polymer of ethylene with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and strontium fluoroborate, and irradiating the mixture with massive electron bombardment at dosages in the range from about 10 to about 40 megarads, thereby generating free radicals within the mixture and inducing cross-linking of the polymer chains.

4. A process for preparing a flame-resistant cross-linked polyethylene composition which comprises uniformly blending a normally solid polymer of ethylene with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and stronium fluoroborate, and from about 2 to about 30 percent by weight of antimony trioxide, all percentages being based on the weight of the polyethylene in the composition, and irradiating the mixture with massive electron bombardment at dosages in the range from about 10 to about 40 megarads, thereby generating free radicals within the mixture and inducing cross-linking of the polymer chains.

5. A process for preparing a flame-resistant cross-linked polyethylene composition which comprises uniformly blending a normally solid polymer of ethylene with from about 4 to about 20 percent by weight of ammonium fluoroborate and irradiating the mixture with massive electron bombardment at dosages in the range from about 10 to about 40 megarads, thereby generating free radicals within the mixture and inducing cross-linking of the polymer chains.

6. A process for preparing a flame-resistant cross-linked polyethylene composition which comprises uniformly blending a normally solid polymer of ethylene with about 4 to about 20 percent by weight of ammonium fluoroborate, and from about 2 to about 30 percent by weight of antimony trioxide, all percentages being based on the weight of the polyethylene in the composition, and irradiating the mixture with massive electron bombardment at dosages in the range from about 10 to about 40 megarads, thereby generating free radicals within the mixture and inducing cross-linking of the polymer chains.

7. A process for preparing a flame-resistant cross-linked polyethylene composition which comprises uniformly blending a normally solid polymer of ethylene with about 4 to about 20 percent by weight of an inorganic fluoroborate selected from the group consisting of ammonium fluoroborate, sodium fluorborate, potassium fluoroborate, calcium fluoroborate, magnesium fluoroborate, barium fluoroborate, and strontium fluoroborate, and from about 0.2 to about 10 percent by weight of an organic peroxy free radical generator, all percentages being based on the weight of the polyethylene in the blended mixture, and heating the resultant mixture to a temperature above that at which the organic peroxy free radical generator pyrochemically decomposes into a free radical, thereby generating free radicals within the mixture and inducing cross-linking of the polymer chains.

8. A process for preparing a flame-resistant cross-linked polyethylene composition which comprises uniformly blending a normally solid polymer of ethylene with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and strontium fluoroborate, from about 2 to about 30 percent by weight of antimony trioxide, and from about 0.2 to about 10 percent by weight of an organic peroxide in which each of the peroxy oxygen atoms is linked to a tertiary carbon atom, all percentages being based on the weight of the polyethylene in the composition, and heating the resultant mixture to a temperature above that at which the organic peroxide pyrochemically decomposes into a free radical, thereby generating free radicals within the mixture and inducing cross-linking of the polymer chains.

9. A flame-resistant cross-linked polyethylene composition comprising the reaction product formed upon generating free radicals within a mixture of a normally solid polymer of ethylene uniformly blended with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and strontium fluoroborate.

10. A flame-resistant cross-linked polyethylene composition comprising the reaction product formed upon generating free radicals within a mixture of a normally solid polymer of ethylene uniformly blended with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and strontium fluoroborate, and from about 2 to about 30 percent by weight of antimony trioxide, all percentages being based on the weight of the polyethylene in the blended mixture.

11. A flame-resistant cross-linked polyethylene composition comprising the reaction product formed upon the irradiation of a mixture of a normally solid polymer of ethylene uniformly blended with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and strontium fluoroborate, with massive electron bombardment at dosages in the range from about 10 to about 40 megarads.

12. A flame-resistant cross-linked polyethylene composition comprising the reaction product formed upon the irradiation of a mixture of a normally solid polymer of ethylene uniformly blended with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and strontium fluoroborate, and from about 2 to about 30 percent by weight of antimony trioxide, with massive electron bombardment at dosages in the range from about 10 to about 40 megarads, all percentages being based upon the weight of the polyethylene in the blended mixture.

13. A flame-resistant cross-linked polyethylene composition comprising the reaction product formed upon the irradiation of a mixture of a normally solid polymer of ethylene uniformly blended with from about 4 to about 20 percent by weight of ammonium fluoroborate with massive electron bombardment at dosages in the range from about 10 to about 40 megarads.

14. A flame-resistant cross-linked polyethylene composition comprising the reaction product formed upon the irradiation of a mixture of a normally solid polymer of ethylene uniformly blended with from about 4 to about 20 percent by weight of ammonium fluoroborate, and from about 2 to about 30 percent by weight of antimony trioxide, with massive electron bombardment at dosages in the range from about 10 to about 40 magarads, all percentages being based upon the weight of the polyethylene in the blended mixture.

15. A flame-resistant cross-linked polyethylene composition comprising the reaction product formed upon heating a mixture of a normally solid polymer of ethylene uniformly blended with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and strontium fluoroborate, and from about 0.2 to about 10 percent by weight of an organic peroxy free radical generator, to a temperature above that at which the organic peroxy free radical generator pyrochemically decomposes into a free radical, all percentages being based on the weight of the polyethylene in the blended mixture.

16. A flame-resistant cross-linked polyethylene composition comprising the reaction product formed upon heating a mixture of a normally solid polymer of ethylene uniformly blended with from about 4 to about 20 percent by weight of an inorganic fluoroborate selected from the group consisting of ammonium fluoroborate, sodium fluoroborate, potassium fluoroborate, calcium fluoroborate, magnesium fluoroborate, barium fluoroborate, and strontium fluoroborate, from about 2 to about 30 percent by weight of antimony trioxide, and from about 0.2 to about 10 percent by weight of an organic peroxide in which each of the peroxy oxygen atoms is linked to a tertiary carbon atom, to a temperature above that at which the organic peroxide pyrochemically decomposes into a free radical, all percentages being based on the weight of the polyethylene in the blended mixture.

References Cited by the Examiner

UNITED STATES PATENTS

| | | | |
|---|---|---|---|
| 2,480,298 | 8/1949 | Happoldt | 260—41 |
| 2,799,556 | 7/1957 | Sullivan | 23—59 |
| 2,823,145 | 2/1958 | Clare et al. | 117—138 |
| 2,888,424 | 5/1959 | Precopio et al. | 260—41 |
| 2,948,641 | 8/1960 | McCluer | 106—15 |
| 3,012,020 | 12/1961 | Kirk et al. | 260—41 |
| 3,239,482 | 3/1966 | Rapp | 260—41 |

MORRIS LIEBMAN, *Primary Examiner.*

K. B. CLARKE, J. S. WALDRON, *Assistant Examiners.*